(12) United States Patent
Albukrek et al.

(10) Patent No.: US 11,495,948 B2
(45) Date of Patent: Nov. 8, 2022

(54) CABLE LEADTHROUGH DEVICE

(71) Applicant: BIMED TEKNIK ALETLER SANAYI VE TICARET A.S., Istanbul (TR)

(72) Inventors: Yilmaz Albukrek, Istanbul (TR); Klaus Kempf, Stuttgart (DE)

( * ) Notice: Subject to any disclaimer, the term of this patent is extended or adjusted under 35 U.S.C. 154(b) by 63 days.

(21) Appl. No.: 17/048,352

(22) PCT Filed: Apr. 11, 2019

(86) PCT No.: PCT/EP2019/059293
§ 371 (c)(1),
(2) Date: Oct. 16, 2020

(87) PCT Pub. No.: WO2019/201743
PCT Pub. Date: Oct. 24, 2019

(65) Prior Publication Data
US 2021/0159680 A1 May 27, 2021

(30) Foreign Application Priority Data
Apr. 20, 2018 (DE) .................... 10 2018 109 591.0

(51) Int. Cl.
*H02G 3/06* (2006.01)
*H02G 3/22* (2006.01)
*H02G 15/013* (2006.01)

(52) U.S. Cl.
CPC .............. *H02G 3/065* (2013.01); *H02G 3/22* (2013.01); *H02G 15/013* (2013.01)

(58) Field of Classification Search
CPC ........ H02G 3/22; H02G 3/0675; H02G 3/065; H02G 15/013
See application file for complete search history.

(56) References Cited

U.S. PATENT DOCUMENTS 3,165,577 A * 1/1965 Jean .................. H01B 17/46
174/144
3,692,927 A * 9/1972 Ellaschuk ............... H02G 7/00
174/211

(Continued)

FOREIGN PATENT DOCUMENTS

| DE | 102010062820 A1 * | 6/2012 | .......... B60L 11/1816 |
| DE | 102010062820 A1 | 6/2012 | |
| DE | 102016214578 A1 | 2/2018 | |

OTHER PUBLICATIONS

International Search Report for corresponding PCT/EP2019/059293.

*Primary Examiner* — William H. Mayo, III
*Assistant Examiner* — Rhadames Alonzo Miller
(74) *Attorney, Agent, or Firm* — Egbert, McDaniel & Swartz, PLLC

(57) ABSTRACT

A cable leadthrough device for leading a cable through an opening in a wall, having a housing that can be fastened in the area of the opening, wherein the cable can be led through the housing along a leadthrough channel parallel to a leadthrough axis, and also having a strain relief device—with at least one clamping element for clamping a cable led through the leadthrough channel, wherein the clamping element is mounted so as to be movable on the housing, by a guide device, along a guide axis inclined in relation to the leadthrough axis, between a clamping position, in which it radially narrows the leadthrough channel, and a release position, in which it releases the leadthrough channel, and a force application system being provided for generating a driving force with a force component that acts along the guide axis and pushes the clamping element towards its clamping position.

18 Claims, 3 Drawing Sheets

(56) References Cited

U.S. PATENT DOCUMENTS

Figure 1:
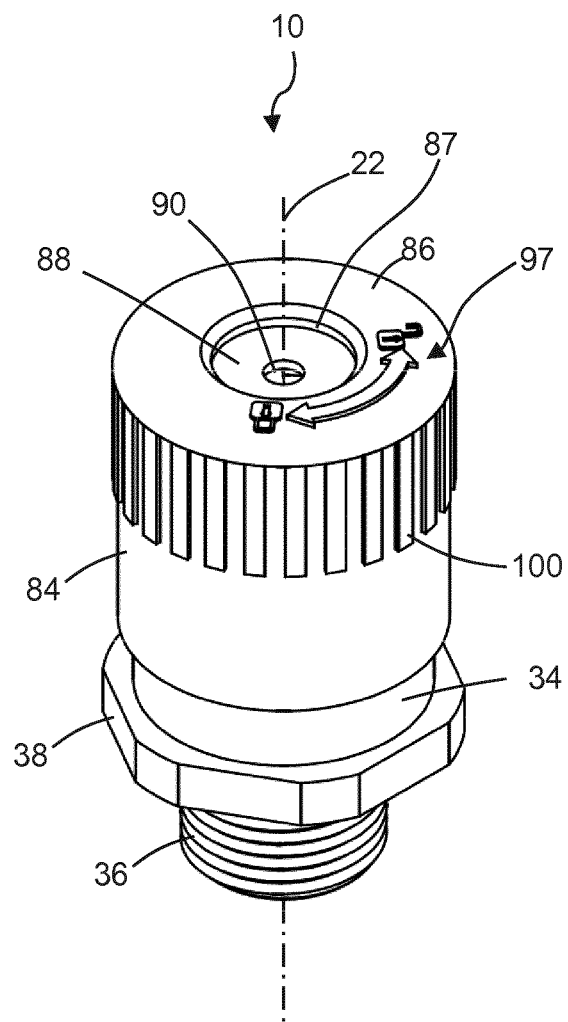

| | | | | |
|---|---|---|---|---|
| 4,121,046 A | * | 10/1978 | Fujita | H01B 17/42 174/140 CR |
| 6,984,790 B1 | * | 1/2006 | Bernstorf | H01B 17/44 174/140 R |
| 2003/0155147 A1 | * | 8/2003 | Robinson | H02G 3/083 174/652 |
| 2005/0035594 A1 | * | 2/2005 | Kiely | H02G 3/0675 285/137.11 |
| 2007/0227772 A1 | * | 10/2007 | Heimlicher | H02G 3/0658 174/653 |
| 2012/0186853 A1 | * | 7/2012 | Rose | H01B 17/10 174/139 |
| 2012/0211274 A1 | * | 8/2012 | Drotleff | H05K 9/0018 174/360 |
| 2014/0020950 A1 | * | 1/2014 | Drotleff | H02G 15/007 174/654 |
| 2014/0125439 A1 | * | 5/2014 | Esseghir | C08G 59/686 336/61 |
| 2019/0103205 A1 | * | 4/2019 | Kolehmainen | H01B 17/44 |

* cited by examiner

CABLE LEADTHROUGH DEVICE

The invention relates to a cable leadthrough device for leading a cable through an opening in a wall, having a housing which can be fastened in the area of the opening, wherein the cable can be led through the housing along a leadthrough channel which is parallel to a leadthrough axis, having a strain relief device, which has at least one clamping element for clamping against a cable which is led through the leadthrough channel.

From DE 10 2016 214 578 A1 a cable leadthrough device is known where a strain relief effect is achieved through spherical clamping elements pressed against a cable leading through a leadthrough channel of a housing by means of a screw joint. Thus, to assemble a cable, the cable must first be led through the leadthrough channel, and in a second step the screw joint must be actuated to press the spherical clamping elements into the outer surface of the led-through cable, and in this way a strain relief effect is achieved.

The present invention is based on the object of providing a cable leadthrough device which allows a particularly simple assembly of a cable and which can be used flexibly. At the same time a high strain relief effect should be achieved.

According to the invention, this object is achieved in a cable leadthrough device of the type mentioned above by mounting at least one clamping element on the housing by means of a guide device displaceable along a guide axis inclined to the leadthrough axis and by transferring said clamping element between a clamping position radially narrows the leadthrough channel and a release position releasing the leadthrough channel and by providing a force application system for generating a driving force, which is effective with at least one force component along the guide axis and applies the at least one clamping element in the direction of its clamping position.

The advantage of such a design is that it allows cables with different diameters to be led through in a simple manner and provides strain relief without the need for an additional assembly step. Thereby a particularly simple and quick assembly of a cable is enabled.

In an initial state of the cable leadthrough device without a led-through cable, the at least one clamping element takes its clamping position, since the clamping element is also applied in the initial state of the cable leadthrough device in the direction of its clamping position by the force application system. In this clamping position, the clamping element is in its radially innermost location relative to the leadthrough axis, so that the leadthrough channel is radially tapered. As a cable is inserted, the at least one clamping element is deflected from its clamping position to its release position. Due to the inclination between the guide axis and the leadthrough axis, the clamping element thereby not only moves parallel to the guide axis, but at the same time also radially outwards away from the leadthrough axis, so that the leadthrough channel is released and the cable can be led through the leadthrough channel. The clamping element is preferably held undetachable on the guide device along the guide axis.

By the fact that the at least one clamping element is movable along the inclined guide axis also in radial direction, a wide clamping region for different cable diameters can be covered. Thereby a flexible usability of the cable leadthrough device is enabled.

Preferably the guide device has stoppers which limit an adjustment path of the at least one clamping element along the guide axis and thus define two end positions. In the context of the present invention, the clamping position and the release position each refer to such an end position or a position adjacent thereto. Depending on the diameter of the cable, a clamping effect or a release of the cable may already occur before reaching the respective end position.

Due to the force applying against the clamping element in the direction of its clamping position and due to the inclination of the guide axis, a clamping force which acts radially inwards relative to the leadthrough axis is transferred from the clamping element to the led-through cable. This has the advantage that a led-through cable is held securely in location and a slipping of the cable is prevented. Furthermore, the clamping force affects that when a pulling back of the cable along the leadthrough axis is realized, the clamping element is carried along with the cable. The clamping element is thereby moved along the guide axis in the direction of its clamping position and thus moved increasingly radially inwards. This causes an increasingly larger radial clamping force, and thus a self-locking effect is achieved. This has the advantage that a simple pulling back of an already led-through cable gives a particularly high strain relief effect.

The driving force generated from the force application system is preferably selected in such a way that the resulting clamping force between the at least one clamping element and a led-through cable is high enough, and that when a pulling back of the cable is realized, the clamping element is carried along securely. On the other hand, a clamping force that is not too high is advantageous, so that when a cable is led through, the at least one clamping element can be easily deflected, and the cable can therefore be easily led through.

In a preferred embodiment, the leadthrough axis encloses an acute angle with the guide axis. The inclination angle between the leadthrough axis and the guide axis determines the ratio of axial movement (along the leadthrough axis) to radial movement of the at least one clamping element when a movement along the guide axis is made. Particularly preferred is when the leadthrough axis encloses an angle between 5° and 45° with the guide axis. In this angular region, self-locking of the cable leadthrough device is particularly beneficial. Smaller angles (for example between 5° and 25°) have the advantage that the at least one clamping element can be carried along more easily by a led-through cable. However, larger angles (for example between 20° and 45°) have the advantage, that a shorter adjustment path of the clamping element in the axial direction (i.e. in the direction along the leadthrough axis) must be provided to be able to displace the clamping element by a predetermined adjustment path in the radial direction. In this way, the cable leadthrough device claims particularly little installation space as seen parallel to the leadthrough axis. This is particularly advantageous when a wide clamping region (and thus a large adjustment path in radial direction) has to be provided. In the framework of the invention, it is therefore particularly preferred when the leadthrough axis encloses an angle between 15° and 30°, in particular between 20° and 25° with the guide axis.

In another preferred embodiment, at least one clamping element has a clamping surface for clamping against a led-through cable, wherein the clamping surface extends completely or at least with a partial section parallel to the leadthrough axis. Preferably, at least one clamping surface is concentric, particularly partially cylindrical, to the leadthrough axis. Furthermore, it is possible that the clamping surface is tangentially oriented to an outer surface of a led-through cable. Through the planar contact between the clamping element and the cable, a clamping force particularly can be transferred securely from the clamping element to the cable and thus a high strain relief of the cable can be achieved. It is particularly preferred when the clamping surface extends over a minimum parallel to the leadthrough axis, for example with a minimum of 2 mm, preferably 5 mm, in particular 10 mm. Through a partially cylindrical and/or tangential design of the clamping surface, in particular for cables with a cylindrical outer surface (for example from an insulation of the cable), a particularly secure force transferring and thus a high strain relief is achieved.

Furthermore, it is also preferred when the clamping surface has a surface structure for improving the adhesion between the clamping surface and a led-through cable. This has the advantage that when a pulling back of the cable is realized the clamping element is securely carried along, and a high self-locking and thus a strain relief effect is achieved. For example, it is possible that the clamping surface has a high surface roughness and/or is produced from a material with a high friction coefficient (for example, by using an elastomer or by using elastomer portions).

It is particularly preferred when the surface structuring is configured in the form of a plurality of clamping knobs distributed over the clamping surface. Herein it is conceivable that when the pressing against the cable in the course of the pulling back of the cable is realized, the clamping knobs bury at least partially into an outer surface, for example into the insulation, of the cable. The resulting positive-locking connection between the clamping element and the cable enables a particularly secure force transferring between the clamping element and the cable and thus enables a high strain relief effect.

In another preferred embodiment at least one clamping element has a sliding slope which is preferably arranged at the edge, for inserting a cable, into the leadthrough channel, wherein the sliding slope preferably has an inclination to the leadthrough axis opposite to the guide axis. The sliding slope is preferably configured as a partial surface of a funnel. By means of the sliding slope a particularly simple and comfortable insertion of a cable into the leadthrough channel is enabled, in which the free end of a led-through cable meets the sliding slope and the clamping element is pressed outwards in a radial direction (against the effect of the force application system). This simplifies particularly the assembly of the cables with larger diameters.

In a particularly preferred embodiment, several clamping elements are provided, which are preferably arranged in a regularly distributed manner over the circumference of the leadthrough channel. The more clamping elements are supplied, the more evenly a clamping force required for strain relief can be exerted on the cable. Moreover, a regular arrangement of the clamping elements over the circumference of the leadthrough channel have advantages of an even distribution of the clamping force. Furthermore, a symmetrical arrangement of the clamping elements leads to a cable which is led through the leadthrough channel always takes a central location relative to the leadthrough channel. In the framework of the invention, for example 2 clamping elements may be provided. Yet, the use of 3 or 4 clamping elements is preferred. However, a higher number of clamping elements may also be provided.

In another preferred embodiment, the force application system has at least one spring, preferably in the form of a compression spring, wherein at least one component of a spring force which is exerted by the at least one spring is effective along the guide axis and applies at least one clamping element in the direction of its clamping position. The spring force thus corresponds to the driving force of the force application system. This enables in a particularly simple, cost-effective and simultaneously reliable way to apply force to the clamping element in the direction of its clamping position.

It is conceivable that for each of a plurality of clamping elements, a separate spring, which is arranged in the region of or adjacent to the respective guide device of a respective clamping element, is provided and in particular may be aligned parallel to the respective guide axis. Yet, it is preferred, when only a single compression spring, which is aligned parallel to the leadthrough axis and is supported at one end on the housing and at the other end on the at least one clamping element, is provided.

In this way, a particularly simple and robust construction is enabled. Particularly in the case where several clamping elements are provided, such a design has the advantage in that the same force (namely the compressive force generated by the spring divided by the number of clamping elements) effects on every clamping elements. As a result, the clamping forces exerted on a led-through cable by the different clamping elements are also identically high.

In another preferred embodiment, an in particular manually actuatable release apparatus is provided, by means of which the at least one clamping element is transferable from its clamping position into its release position. This enables to eliminate the clamping effect of the at least one clamping element, preferably without requiring an additional tool thereto. An already assembled cable can thus be removed from the cable leadthrough device in a particularly simple way.

Furthermore, it is preferred if the release apparatus has an actuating element, wherein at least one component of an actuating force exerted on the at least one clamping element by actuation of the actuating element is effective along the guide axis and applies the at least one clamping element in the direction of its release position. When transferring of the actuating element from its rest position to its actuating position is realized, the at least one clamping element is transferred from a clamping position to a release position. This enables to transfer the at least one clamping element from a position of clamping the led-through cable to a position of releasing the cable by simply actuating the actuating element. Consequently, abolishing the clamping effect of at least one clamping element is realized in a particularly comfortable and safe way.

Furthermore, it is preferred if the actuating element is mounted on the housing movably along an actuating path between a rest position and an actuating position, and if the actuating force is generatable by or on transferring from the rest position to the actuating position. Through mounting the actuating element on the housing, a particularly stable arrangement is enabled, so that a secure function of the actuating element is ensured.

In another preferred embodiment, the actuating element is rotatably mounted on the housing and is rotatable about the leadthrough axis of the housing. It is particularly preferred when such a rotational movement of the actuating element transfers the clamping element from its clamping position to its release position. This enables a simple and intuitive operation of the release apparatus. Such a rotation is preferably realized manually in which the actuating element is gripped and rotated. Yet, it is also possible for the actuating element to have a tool engagement surface, for example, for an open-end wrench, by means of which in addition or as an alternative to a manual actuation the actuating element can be actuated.

Furthermore, it is preferred when the actuating element has a leadthrough opening for leading through a cable, wherein a sealing membrane for sealing a led-through cable is provided in the region of the leadthrough opening. Through the sealing membrane it is ensured that the functions of the release apparatus and/or the strain relief device are not impaired by impurities, for example dust and/or water. It is preferred when the sealing membrane is produced from an elastomer material and/or a rubberized fabric.

In another preferred embodiment a sealing apparatus is arranged on the housing for sealing a cable which is led through the housing. This has the advantage that a wall can also be securely sealed in the region of an opening which determines the leading of a cable, and thus a high degree of IP-protection is achieved.

Further it is preferred when the sealing apparatus has at least one conically tapered sealing body. In this way it is ensured that cables with different diameters can be securely sealed. It is particularly preferred when the sealing body is produced from an elastic material, for example an elastomer. It is particularly preferred when the sealing body is supported on a reinforcing element which is produced from of a thermoplastic material.

In another preferred embodiment, the housing has a fastening body for fastening to the wall and a preferably screwable housing body which can be connected to the fastening body. The two-piece construction facilitates a particularly simple production and assembly of the cable lead through apparatus. Furthermore, a flexible utilization of the cable lead through apparatus is enabled. For example, it is conceivable, that different types of fastening bodies are maintained for different wall openings and/or with different fastening means, which are then joined to form a construct with a standardized housing body.

Further features and advantages of the invention are the subject of the following description and the graphic representation of a preferred embodiment.

In the Figures

Figure 2:
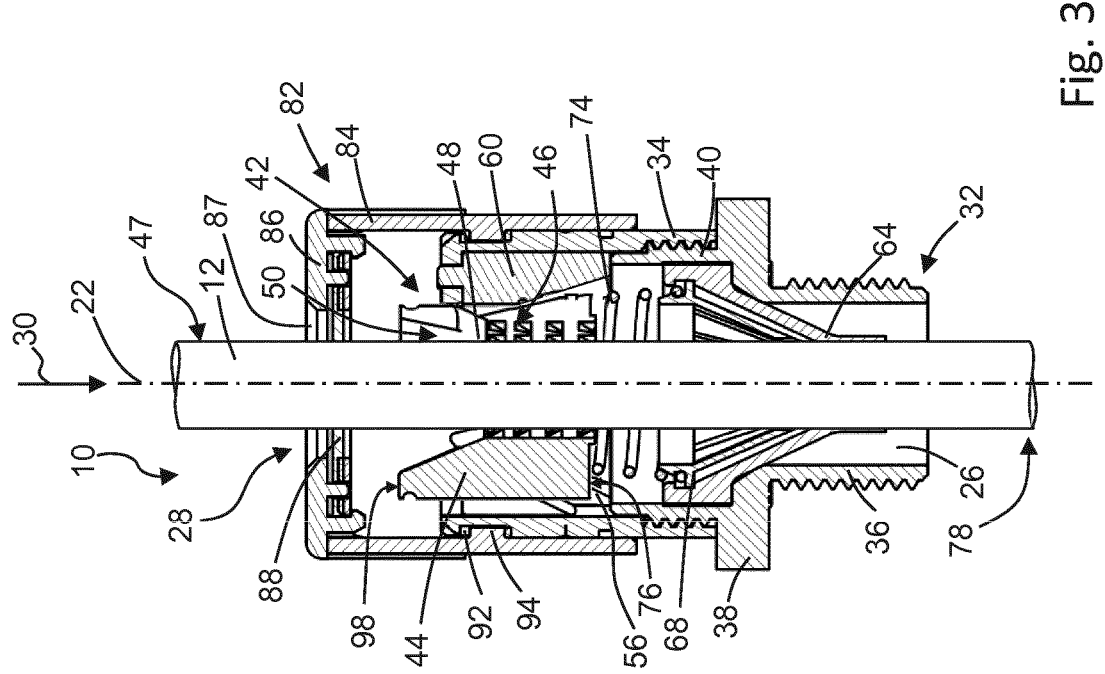
Figure 3:
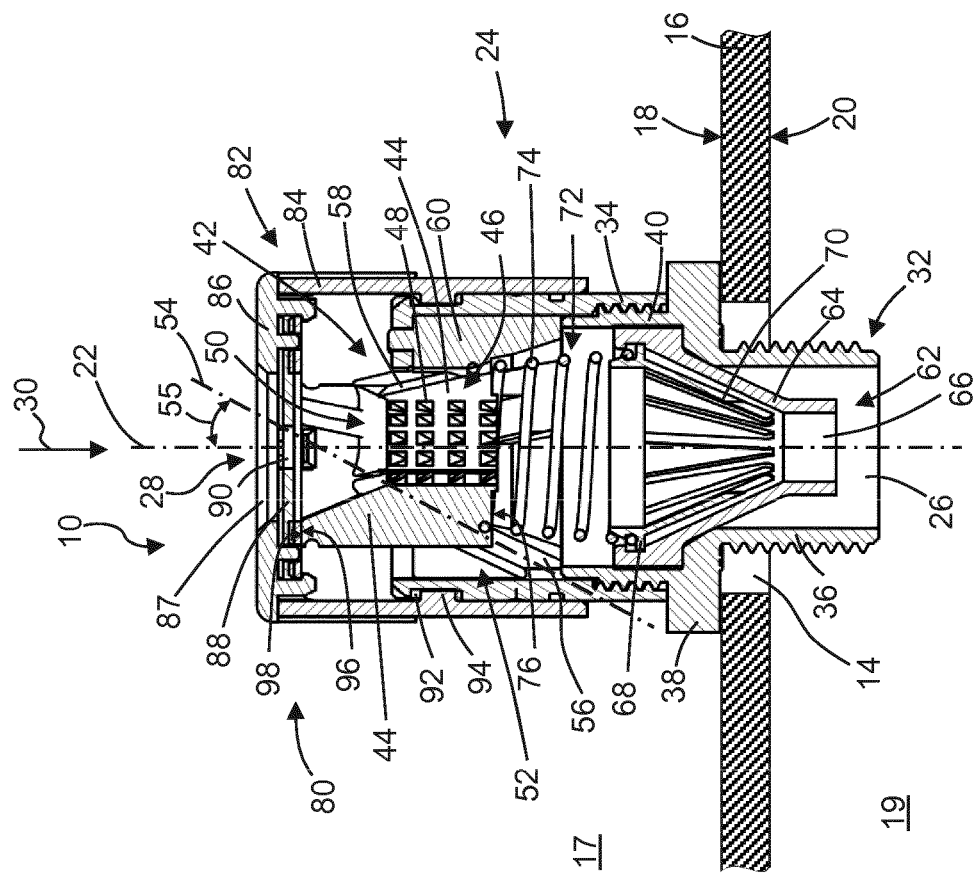
Figure 5:
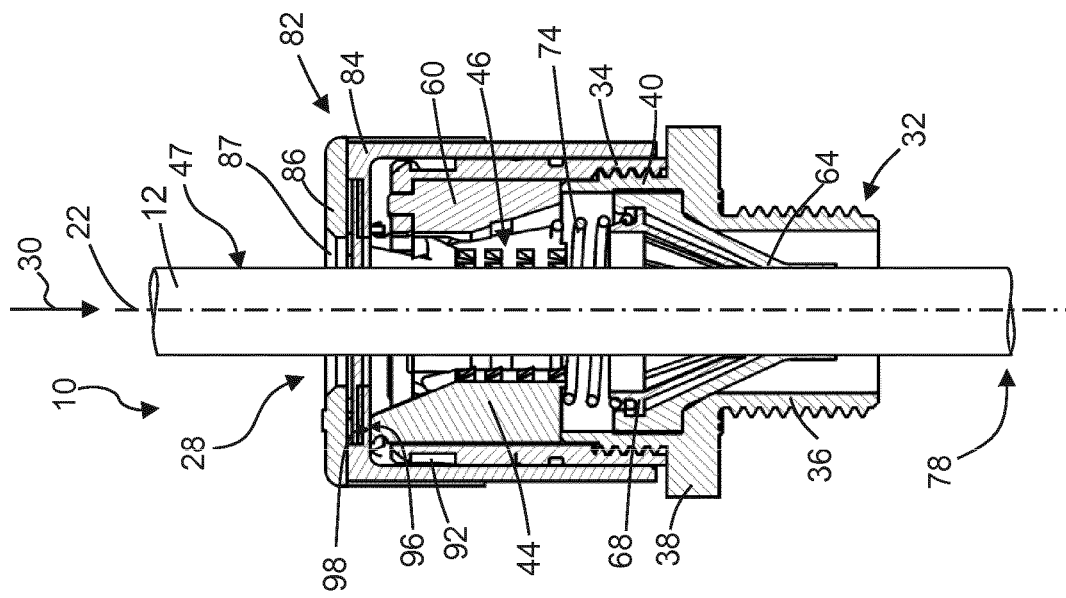
Figure 4:
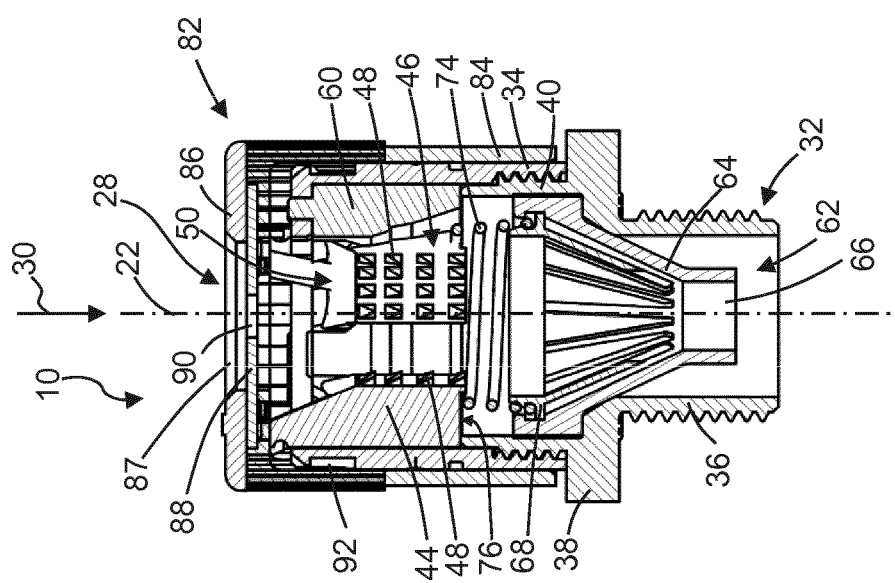

FIG. 1 a perspective view of an embodiment for a cable leadthrough device;

FIG. 2 a sectional view of the cable leadthrough device according to FIG. 1 along a vertical sectional plane, wherein an actuating element is shown in its rest position;

FIG. 3 a view corresponding to FIG. 2, with a led-through cable;

FIG. 4 a view corresponding to FIG. 2, wherein with the actuating element is shown in its actuating position; and FIG. 5 a view corresponding to FIG. 3, wherein the actuating element is shown in its actuating position.

In the FIG. 1 a cable leadthrough device, which is marked with the reference sign 10 is shown. The cable leadthrough device (10) serves for leading a cable (12) which is shown in FIGS. 3 and 5 through an opening (14) in a wall (16) (see FIG. 2). The opening (14) may for example, be an opening (14) in a housing wall of an electrical switch cabinet or an electrical appliance.

The wall (16) has an outer side (18) (for example, which faces a circumference (17) of a switch cabinet) and an inner side (20) (for example, which faces an inner space (19) of a switch cabinet) (see FIG. 2). In the context of the present invention, the outer side (18) refers to one side of the wall (16), from which the cable leadthrough device (10) is assembled onto the wall (16).

The cable leadthrough device (10) extends along a central leadthrough axis (22), which is oriented perpendicular to the outer side (18) of the wall (16) in the assembled state of the cable leadthrough device (10).

The cable leadthrough axis (10) comprises a housing (24), which extends essentially concentrically about the leadthrough axis (22). The housing (24) limits a central inner space (26), through which the cable (12) can be led or already is led along a leadthrough channel (28) which is parallel to the leadthrough axis (22) (see FIG. 3). A leadthrough direction (30) of the cable which is coaxial to the leadthrough axis (22) herein starts from the outer side (18) of the wall (16) and extends in the direction of the inner side (20) of the wall (16) (see arrow (30) in FIGS. 2 to 5).

The housing (24) has a fastening body (32) and a housing body (34) (see FIG. 2). The fastening body (32) serves for fastening to the wall (16). The fastening body (32) has a first connecting piece (36) for insertion into the opening (14) of the wall (16). The first connecting piece (36) is linked to a housing projection (38), which serves for clamping against the outer side (18) of the wall (16). The first connecting piece (36) can be fastened to the wall (16) in a known way. For example, a part of the first connecting piece (36) projecting into the inner space (19) of a switch cabinet can be screwed with a locknut (not shown in the figures). A fastening by latching (by using catch elements arranged on the first connecting piece, which is not shown in the figures) is also possible.

The fastening body (32) also comprises a second connecting piece (40), which is connected to the first connecting piece (36) by means of a screw joint. For example, the second connecting piece (40) has an external thread with which it can be screwed to an internal thread of the housing body (34).

The cable leadthrough device (10) further has a strain relief device (42), which prevents moving a led-through cable (12) against the leadthrough direction (30), whereby an electrical connection at the end side of the cable with electrical components would be subject to tensile stress. The strain relief device (42) has three clamping elements (44), which—angularly offset at an angle of 120° to each other—are arranged in a distributed manner over the circumference of the cable leadthrough device (10) (in the sectional views of FIGS. 2 to 5 only two clamping elements are shown). The clamping elements (44) are preferably configured so as to be identical to each other.

The clamping elements (44) each have a clamping surface (46) for clamping against the outer surface (47) of a cable (12), which is arranged in the leadthrough channel (28). The clamping surface (46) of each of the clamping elements (44) extends parallel to the leadthrough axis (22) and is partially cylindrical with a concave curvature relative to the leadthrough axis (22).

The clamping surfaces (46) each have a plurality of clamping knobs (48), which preferably arranged in a regularly distributed manner over the respective clamping surface (46). The clamping knobs (48) serves for clamping against the outer surface (47), which for example is formed by the outer side insulation of a led-through cable (12). The effective contact area between a clamping element (44) and a led-through cable (12) depends on the diameter of the cable (12) and the clamping force that is in effect between the clamping surface (46) and the cable (12); for a cable (12) whose outer surface (47) has a radius identical to the radius of curvature of the clamping surfaces (46), the effective clamping surface is at maximum level.

The clamping elements (44) each have a sliding slope (50) at an edge region facing away from the fastening body (32). The sliding slopes (50) are each inclined relative to the leadthrough axis (22) (for example by an inclination angle of about 20° to about 70°) and taper towards the leadthrough axis (22) as seen from the leadthrough direction (30). The sliding slopes (50) of each clamping elements (44) form a funnel-shaped guide section for inserting a cable (12) into the leadthrough channel (28) (see FIG. 2 and FIG. 3).

The cable leadthrough device (10) further has a guide device (52), by means of which a respective clamping element (44) is mounted on the housing (24), preferably on the housing body (34), movably along a guide axis (54) (see FIG. 2). The guide device (52) has particularly groove-shaped guide surfaces (56), which is provided on the housing body (34), and which interact with corresponding particularly groove block-shaped guide sections (58) of the clamping elements (44). The guide surfaces (56) can be formed by guide elements (60), which are supplied separately from the housing (24) and in the inner space (26) of the housing (24) are preferably fastened to the housing body (34). It is also possible that the guide surfaces (56) are formed integrally with the housing body (34). The guide sections (58) of the clamping elements (44), as seen in radial direction, are arranged on the side of the clamping elements (44) facing away from the clamping surface (46).

The guide surfaces (56) and the corresponding guide sections (58) extend parallel to the guide axis (54). The guide axis (54) has an inclination relative to the leadthrough axis (22). The guide axis (54) and the leadthrough axis (22) enclose an acute angle (55). This is preferably about 20° to about 25°, for example 22.5°. Due to the inclination of the guide axis (54), a displacement of a clamping element (44) along the guide axis (54) does not only lead to a displacement in axial direction (along the leadthrough axis (22)), but also to a displacement in radial direction (relative to the leadthrough axis (22)). As seen in leadthrough direction (30), the guide axis (54) has to be positioned away from the leadthrough axis (22).

Thus, a displacement of a clamping element (44) in leadthrough direction (30) leads to a displacement of the clamping element (44) radially outwards (i.e. from the leadthrough axis (22)).

The guide device (52) preferably has stoppers which limit a maximum adjustment path of the clamping elements (44) along the guide axis (54) and thus define two end positions. In a first end position (maximum clamping position) the respective clamping element (44) is found relative to the leadthrough axis (22) in its radially innermost location and thus axially in its location at the maximum distance from the fixing body (32) (see FIG. 2). The leadthrough channel (28) is radially tapered by the clamping elements (44) in this position. In a second end position (maximum release position) the respective clamping element (44) is found relative to the leadthrough axis (22) in its radially outermost location and axially in its location at a minimum distance from the fixing body (32) (see FIG. 4). In the release position the leadthrough channel (28) is released so that a cable (12) can be led through. Between the two end positions, the clamping elements (44) can take further clamping positions or release positions, depending on the diameter of a led-through cable (12) (see below).

The cable leadthrough device (10) further has a sealing apparatus (62) for sealing a cable (12) which is led through the housing (24). The sealing apparatus (62) has a sealing body (64). The sealing body (64) is arranged in the inner space (26) of the housing (24) and is supported by the fastening body (32). The sealing body (64) is configured as a cone, which is configured to be concentric to the leadthrough axis (22) and which tapers in the leadthrough direction (30). The sealing body (64) merges into a concentric hollow cylinder in its tapered area, which is parallel to the leadthrough axis (22), which circumscribes a passage opening (66) for leading the cable (12).

The sealing body (64) is preferably produced from an elastomer. When a leading through of a cable (12) along the leadthrough direction (30) is realized, the passage opening (66) elastically expands and settles in a sealing manner on the cable (12) (see FIG. 3 and FIG. 5). Thus, a high sealing effect (IP degree of protection) can be achieved.

The sealing apparatus (62) further has a reinforcing element (68) for supporting the sealing body (64), which is preferably produced from a thermoplastic material. The reinforcing element (68) is arranged inside the sealing body (64). The reinforcing element (68) has a plurality of webs (70) arranged in a regularly distributed manner over the circumference, which extend parallel to an inner wall of the sealing body (64) in the leadthrough direction (30) conically to the leadthrough axis (22).

The cable leadthrough device (10) further has a force application system (72) for generating a driving force. The force application system (72) has a spring (74), which is preferably configured as a compression spring. The spring (74) is arranged in the inner space (26) of the housing (24) and extends parallel to the leadthrough axis (22). The spring (74) is supported with a first end on the reinforcing element (68) of the sealing apparatus (62), which in turn is supported on the fastening body (32). It is also possible for the spring (74) to be supported with a first end on the fastening body (32) of the housing (24). An opposite end of the spring (74) is supported on a support surface (76) of the respective clamping element (44) facing the fastening body (32). The support surface preferably extends perpendicular or substantially perpendicular to the leadthrough axis (22).

The spring (74) exerts a driving force (spring force) along the leadthrough axis (22) and against the leadthrough direction (30) on the clamping elements (44), whereby these are pressed along the guide axis (54) in the direction of their clamping position. If there is no cable (12) leading through the leadthrough channel (28), the clamping elements (44) assumes a (maximum) clamping position. FIG. 2 shows such an initial state without a led-through cable (12). In this state, the leadthrough channel (28) is tapered to a maximum by the clamping elements (44).

When inserting a cable (12) into the leadthrough channel (28) along the leadthrough direction (30) is realized, the cable (12) with its free end (78), firstly bears against the sliding slopes (50) of the clamping elements (44). In this case, an assembly force exerted on the sliding slopes (50) from the cable (12) is deflected in the direction of the guide axes (54) and affects counter to the driving force of the force application system (72). Once the assembly force that is affected along the guide axes (54) exceeds the driving force that is affected along the guide axis (54), the clamping elements (44) are moved from their clamping position towards the direction of their release position. The clamping elements (44) herein are further moved radially outwards, whereby the leadthrough channel (28) expands. After reaching an opening width of the leadthrough channel (28), which corresponds to the diameter of the cable (12), the cable slides parallel to the clamping surfaces (46) along the leadthrough axis (22) through the leadthrough channel (28) (see FIG. 3).

The maximum adjustment path of the clamping elements (44) in radial direction determines the clamping region, within which cable (12) with different cable diameters can be used.

Because of the clamping elements (44) are permanently applied from the force application system (72) in the direction of their clamping position (i.e. in the direction of their radially innermost location), the clamping elements (44) are permanently applied radially inwards. The clamping elements (44) are therefore always in contact with the led-through cable (12) and always by their clamping surfaces (46) exert clamping force that is affected radially inward on the cable (12) (see FIG. 3).

The clamping force and the associated adhesive effect between the clamping elements (44) and the cable (12) leads that when a pulling back of the cable (12) against the leadthrough direction (30) is realized, the clamping elements (44) are carried along with the cable (12) and thus moved along the guide axis (54) in the direction of their clamping position. The clamping elements are thus moved increasingly radially inwards. The leadthrough channel (28) is thus increasingly restricted, and an increasingly larger radial clamping force is exerted on the cable (12). This causes a self-locking of the cable (12) and therefore a high strain relief effect is achieved. The cable (12) therefore cannot be removed from the cable leadthrough device (10) against the leadthrough direction (30); the clamping elements (44) and the outer surface (47) of the cable (12) are "wedged" together.

To be able to break the strain relief effect, the cable leadthrough device (10) has a release apparatus (80, by means of which the clamping elements (44) can be transferred from a position of clamping a led-through cable (12) to a position of releasing the cable (12). The release apparatus (80) has an actuating element (82). The actuating element (82) has a cylindrical main body (84), which extends concentrically to the leadthrough axis (22). The actuating element (82) also has a cover (86) which is arranged on the front face of the main body (86). The main body (84) and the cover (86) are configured integral with each other or provided separately from each other and connected for example by means of a latching connection to each other. The cover (86) has a central recess (87).

The actuating element (82) has a sealing membrane (88) in the region of the recess, which for its part has a leadthrough opening (90) for leading a cable (12). The sealing membrane (88) is preferably produced from a rubberized fabric. The diameter of the leadthrough opening (90) is preferably smaller than the diameter of a thinnest ledthrough cable (12). When the leading of a cable (12) is led realized, the leadthrough opening (90) expands elastically and settles in a sealing manner with its edge on the cable (12).

The actuating element (82) is arranged on the housing (24) and with its cylindrical main body (84) overlaps at least partially the housing body (34). The actuating element (82) is guided to a link (92) which is arranged on the outer side of the housing body (34), its link track extends in a helical-shaped manner over the circumference of the housing body (34). The actuating element (82) has at least one clamping section (84), for example two clamping sections (94), which are arranged on two opposite sides of the inner wall of its main body (84). The at least one clamping section (84) engages the link track of the link (92) and is guided therefrom (see FIG. 2).

Due to the helical-shape of the link track, when a moving along the link track is realized, the actuating element (82) not only takes a rotational movement about the leadthrough axis (22) but also at the same time moves in the axial direction parallel to the leadthrough axis (22). The link track (92) preferably has stoppers, which limit a maximum adjustment path of the clamping elements (82) along the link track and thus define two end positions. In a first end position (rest position) the actuating element (82) is spaced at a maximum from the fastening body (32) in axial direction (see FIG. 2 and FIG. 3) In a second end position (actuating position) the actuating element (82) is spaced at a minimum from the fastening body (32) in axial direction (see FIG. 4 and FIG. 5)

The actuating element (82), in particular its cover (86), further has a contact surface (96) facing the clamping elements (44), which can interact with a contact section (98) of the each clamping element (44) facing the contact surface (96), once the contact surface (96) touches the contact section or contact sections (98). When a rotation movement of the actuating element (82) in the direction of its actuating position and thus associated axial movement in the leadthrough direction (30) is realized, the actuating element (82) bears against over its contact surface (96) to the contact section (98) of a respective clamping element (44). As a result, the clamping elements (44) is applied with an actuating force in the leadthrough direction (30). If the actuating force is greater than the opposing driving force of the force application system (72), the clamping elements (44) move in the direction of their release position. Therefore, the clamping elements (44) are moved radially outwards so that the clamping effect on a led-through cable (12) is abolished (see FIGS. 4 and 5). In this way, the clamping surfaces (46) are released from the outer surface (47) of the cable (12) and the released cable (12) can be moved passively along the leadthrough axis (22) and, if necessary, also can be removed completely.

Further, a person who assembles only has to exert a rotational movement on the actuating element (82) to eliminate the strain relief effect. Preferably, the cover (86) has a corresponding marking (97), which visualizes the movability of the actuating element (82) between its rest position and its (maximum) actuation position, see FIG. 1. How far the actuating element (82) must be rotated to the direction of its (maximum) actuation position for eliminating a strain relief effect, depends on the diameter of the led-through cable (12). For example, when thinner cables (12) are possible, a release of the cable (12) already is performed before reaching the (maximum) actuating position of the actuating element (82). In any case, the actuating element (82) can be brought to its maximum actuating position independently of the diameter of the cable (12) in order to expand the leadthrough channel (28) to a maximum and to be able to move a cable (12) along the leadthrough axis (22).

The maximum adjustment path of the actuating element (82) in the axial direction (i.e. the adjustment path between its rest position and its actuating position) is preferably chosen, such that it corresponds to the maximum adjustment path of the clamping elements (44) in the axial direction (i.e. the adjustment path between the maximum clamping position and the maximum release position).

The actuation of the actuating element (82) is preferably performed manually. To be able to secure the actuation, the actuating element (82) has a corrugated engagement surface (100) on the outer surface of its main body (see FIG. 1). It is also possible that, the actuating element (82) has a tool engagement surface, for example for an open-end wrench.

The invention claimed is:

1. A cable lead-through device for leading cable through an opening in a wall, the cable lead-through device comprising:
a housing adapted to be fastened at the opening in the wall, said housing having a lead-through channel that is parallel to a lead-through axis, the lead-through channel adapted to allow the cable to be led through the housing, said housing having a strain relief device with at least one clamping element, the at least one clamping element adapted to clamp the cable led through the lead-through channel, wherein the at least one clamping element is mounted so as to be movable on said housing by a guide device having a grooved guide surface along a guide axis, the guide axis being inclined in relation to the lead-through axis, the at least one clamping element movable between a clamping position and a release position, wherein the guide device radially narrows in the lead-through channel and releases the lead-through channel in the release position; and a force applicator cooperative with the at least one clamping element so as to push the at least one clamping element toward the clamping position, said force applicator generating a driving force with at least one force component that acts along the guide axis, the force component pushing the at least one clamping element toward the clamping position.

2. The cable lead-through device of claim 1, wherein the lead-through axis encloses an acute angle with the guide axis.

3. The cable lead-through device of claim 2, wherein the acute angle is between 5° and 45°.

4. The cable lead-through device of claim 1, wherein the at least one clamping element has a clamping surface adapted to clamp against the cable, wherein the clamping surface extends at least partially parallel to the lead-through axis.

5. The cable lead-through device of claim 4, wherein the clamping surface has a plurality of knobs distributed over the clamping surface.

6. The cable lead-through device of claim 1, wherein the at least one clamping element has a sliding slop having an inclination toward the lead-through axis opposite the guide axis, the sliding slop adapted to allow the cable to be inserted into the lead-through channel.

7. The cable lead-through device of claim 1, wherein the at least one clamping element comprises a plurality of clamping elements arranged in a regularly distributed manner over a circumstance of the lead-through channel.

8. The cable lead-through device of claim 1, wherein said force applicator has at least one spring.

9. The cable lead-through device of claim 8, wherein the at least one spring is a compression spring.

10. The cable lead-through device of claim 1, further comprising:

a manually actuatable release apparatus cooperative with the at least one clamping element so as to cause the at least one clamping element to transfer from the clamping position to the release position.

11. The cable lead-through device of claim 10, wherein said manually actuatable release apparatus has an actuating element, at least one component of an actuating force exerted on the at least one clamping element by an actuation of the activating element being effective along the guide axis and urging the at least one clamping element toward the release position.

12. The cable lead-through device of claim 11, wherein the actuating element is movably mounted on said housing along an actuating path between a rest position and an actuating position, the actuating force being generated by or on transferring from the rest position to the actuating position.

13. The cable lead-through device of claim 11, wherein the actuating element is rotatably mounted on said housing and is rotatable around the lead-through axis of said housing.

14. The cable lead-through device of claim 11, wherein the actuating element has a lead-through opening adapted to lead the cable therethrough, wherein a sealing membrane is adapted to seal the cable at the lead-through opening.

15. The cable lead-through device of claim 1, further comprising:

a sealing apparatus positioned on said housing so as to seal the cable.

16. The cable lead-through device of claim 15, wherein said sealing apparatus has at least one sealing body that conically narrows.

17. The cable lead-through device of claim 1, wherein said housing has a fastening body, the fastening body adapted to fasten to the wall.

18. The cable lead-through device of claim 17, wherein the fastening body has a screwable body connected to the fastening body.

* * * * *